(12) United States Patent
Bangalore et al.

(10) Patent No.: US 8,090,583 B1
(45) Date of Patent: Jan. 3, 2012

(54) SYSTEM AND METHOD OF AUTOMATICALLY GENERATING BUILDING DIALOG SERVICES BY EXPLOITING THE CONTENT AND STRUCTURE OF WEBSITES

(75) Inventors: Srinivas Bangalore, Morristown, NJ (US); Junlan Feng, North Plainfield, NJ (US); Mazin Rahim, Warren, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 160 days.

(21) Appl. No.: 11/929,060

(22) Filed: Oct. 30, 2007

Related U.S. Application Data

(62) Division of application No. 10/740,156, filed on Dec. 18, 2003.

(60) Provisional application No. 60/434,257, filed on Dec. 18, 2002.

(51) Int. Cl.
*G10L 11/00* (2006.01)

(52) U.S. Cl. ............... 704/270; 704/270.1; 704/275

(58) Field of Classification Search .................. None
See application file for complete search history.

(56) References Cited

U.S. PATENT DOCUMENTS

| | | | |
|---|---|---|---|
| 6,604,075 B1 | 8/2003 | Brown et al. | |
| 7,231,395 B2 | 6/2007 | Fain et al. | |
| 2002/0010586 A1 | 1/2002 | Ito et al. | |
| 2002/0010715 A1 | 1/2002 | Chinn et al. | |
| 2002/0032564 A1 | 3/2002 | Ehsani et al. | |
| 2002/0080927 A1 | 6/2002 | Uppaluru | |
| 2002/0128821 A1 | 9/2002 | Ehsani et al. | |
| 2002/0164000 A1 | 11/2002 | Cohen et al. | |
| 2002/0196679 A1* | 12/2002 | Lavi et al. | 365/200 |
| 2003/0046088 A1* | 3/2003 | Yuschik | 704/276 |
| 2003/0093428 A1 | 5/2003 | Suzumori et al. | |
| 2003/0115289 A1 | 6/2003 | Chinn et al. | |
| 2003/0182124 A1 | 9/2003 | Khan | |
| 2004/0117804 A1* | 6/2004 | Scahill et al. | 719/320 |
| 2004/0205614 A1 | 10/2004 | Keswa | |

FOREIGN PATENT DOCUMENTS

WO WO 02/079896 A2 * 10/2002

OTHER PUBLICATIONS

Nicolas Roussel, Oliver Hitz and Rolf Ingold, "Web-based Cooperative Document Understanding", ICDAR 2001.

Susan Dumais, Michele Banko, Eric Brill, Jimmy Lin, Andrew Ng, 'Web Question Answering : Is More Always Better?', SIGIR'02, Aug. 11-15, 2002, Tampere, Finland, pp. 291-298.

David Pinto, Michael Branstain, Ryan Coleman, W. Bruce Croft, Matthew King, "QuASM: A System for Question Answering Using Semi-Structured Data", JCDL'02, Jul. 13-17, 2002 Portland, Oregon, USA.

(Continued)

*Primary Examiner* — Leonard Saint Cyr

(57) ABSTRACT

A method and system are disclosed for providing a dialog interface for a website. The method comprises at each node in a website, computing a summary, a document description and an alias. A dialog manager within a spoken dialog service utilizes the summary, document description and alias for each website node to generate prompts to a user, wherein nodes in the website are matched with user requests. In this manner, a spoken dialog interface to the website content and navigation may be generated automatically.

18 Claims, 8 Drawing Sheets

OTHER PUBLICATIONS

Eric J. Glover, Kostas Tsioutsiouliklis, Steve Lawrence, David M. Pennock, Gary W. Flake, "Using Web Structure for Classifying and Describing Web Pages", WWW2002, May 7-11, 2002 Honolulu, Hawaii, USA pp. 562-569.

Craig A. Knoblock, Steven Minton, Jos'e Luis Ambite, Maria Muslea, Jean Oh, Martin Frank, "Mixed-Initiative, Multi-Source Information Assistants", WWW2001, May 1-5 2001, Hong Kong, pp. 697-707.

http://www.internetspeech.com/, industry white paper, printed Dec. 2003.

William W. Cohen, Matthew Hurst, Lee S. Jensen, "A Flexible Learning System for Wrapping Tables and Lists in HTML Documents", WWW2002, May 7-11, 2002, Honolulu, Hawaii, USA, pp. 232-241.

A.F.R. Rahman, H. Alam, R. Hartono and K. Ariyoshi, Automatic Summarization of Web Content to Smaller Display Devices, ICDAR2001.

http://www.w3.org/XML/.

Mashiro Araki, Tasuku Ono, Kiyoshi Usad, Tasuhisa Nhmi, "An Automatic Dialogue System Generator from the Internet Information Contents", Eurospeech 2001.

Xiaoli Li, Bing Liu, Tong-Heng Phang, and Minqing Hu, "Web Search Based on Micro Information Units", WWW2002.

Gerald Penn, Jianying Hu, Hengbin Iuo, Ryan McDonald, Flexible Web document Analysis for Delivery to Narrow bandwidth Devices, ICDAR2001.

B. Chidlovskii, "Wrapper generation by k-reversible grammar induction", In the proceedings of the Workshop on Machine Learning and Information Extraction, Berlin, Germany, 2000.

I. Muslea, S. Minton, and C. Knoblock. "Wrapper induction for semi structured information sources", Journal of Autonomous Agents and Multi-Agent Systems, 16(2), 1999.

Mindfabric, Technology Whitepaper, printed Dec. 17, 2003 from www.mindfabric.com.

Webcontent printed from www.iphrase.com Dec. 17, 2003.

* cited by examiner

1. *WebTalk:* Hi, this is at&t local services. How may I help you?
   *User:* Hi.
2. *WebTalk:* Hi, how may I help you?
   *User:* What can I say?
3. *WebTalk:* I can tell you about products & services, solutions, LNP and local data services. How may I help you?
   *User:* What's LNP, please.
4. *WebTalk:* LNP stands for local number portability.
   *User:* Please tell me more about that.
5. *WebTalk:* You can download Handbooks and Guides from our website.
   AT&T Business Services LNP Port Out Guide (PDF, 158Kb)
   AT&T Business Services Local Number Portability Procedures Handbook.pdf (PDF, 500 Kb)
   *User:* Thanks
6. *WebTalk:* You're welcome. Anything else?
   *User:* Ok, tell me about your solutions.
7. *WebTalk:* I can give more information about local solutions, including business communication goals, business profile and business telephone systems. How may I help you?
   *User:* Do you have special solutions for small business customer
8. *WebTalk:* Yes, Whether you use a PBX, key system, computer modem, fax machine, or just plain telephone, AT&T PrimePath provides a full-featured service for all your local telecommunications needs. AT&T PrimePath provides the highest level of service at market competitive rates for small businesses or remote locations.

FIG. 6       600

Define Summarize_Node (N, L, T)

$S^{(N)} = \{\}; A^{(N)} = \{a_{ij}\}; Token^{(N)} = (t_m);$ $A^{(N)} = $ Initialize_A (N,T);

$Token^{(N)} = $ Initialize_Token (L);

While $(|S^{(N)}| < L$ and $|A^{(N)}| > 0)$ $(m,n) = arg_{ij} max(w_{ij}), w_{ij} > 0$ $S^{(n)} = S^{(N)} + S_{mn}$ Remove $a_{mn}$ from $A^{(N)}$ $t_m = t_m - 1$ For remaining items $a_{ij}$ in $A^{(N)}$ do:

Remove $a_{ij}$, if $t_i <= 0$ or $w_{ij} = 0$ or $S_{ij}$ consists of same terms as $S_{mn}$ Endfor Endwhile

*FIG. 8*

| RENDERED PAGE 802 | IMPLEMENTATION 1: 804 | IMPLEMENTATION 2: 806 |
|---|---|---|
| • hardware<br>• software | \<li>hardware<br>\<li>software | \<img src="dot.gif"><br>  hardware\<br><br>\<img src="dot.gif"><br>  software |

SYSTEM AND METHOD OF AUTOMATICALLY GENERATING BUILDING DIALOG SERVICES BY EXPLOITING THE CONTENT AND STRUCTURE OF WEBSITES

PRIORITY APPLICATION

The present application is a divisional of U.S. patent application Ser. No. 10/740,156 filed Dec. 18, 2003 which claims priority to U.S. Provisional Patent Application No. 60/434,257 filed Dec. 18, 2002, the contents of which are incorporated herein by reference.

BACKGROUND OF THE INVENTION

1. Field of the Invention

The present invention relates to spoken dialog systems and more specifically to a method of analyzing website content to generate a spoken dialog service for websites.

2. Introduction

The task of creating customized spoken dialog applications has traditionally been known to be expensive, requiring significant resources and a certain level of expertise. The cost and complexity for developing such applications present an obstacle in porting dialog systems especially those required for customer care and help desk applications.

Spoken dialog systems provide individuals and companies with a cost effective means of communicating with customers. Some examples of successfully deployed spoken dialog systems include AT&T's How May I Help You? (HMIHY) system, UBS Voice and AOL-By-Phone. For example, the AOL-By-Phone service employs automatic speech recognition technology and text-to-speech (TTS) technology to enable users to call and receive email and other information via a spoken dial.

There are several barriers that hinder the portability of such systems to new services. The most significant challenge is the tremendous amount of human knowledge and expertise required to build and maintain them. Developing such applications involves a great deal of effort in task-specific data collection and design of handcrafted rules for the various components of a dialog system. Further, the cost of developing such systems may keep smaller companies from seeking this cost saving service. Large companies may be hesitant to use such a service because of the delay required to develop the system and the ongoing need to maintain it.

It is evident that the World Wide Web now has become the largest sharable and searchable repository of information. Recent estimates predict the size of the indexable web to be more than 4 billion pages. Almost every company currently has its own website. In order to have their customers get online information in a timely, effective and efficient way, companies expend a large amount of resources to organize these sites to be easily manageable. When preparing a website, months-long effort has been invested in analyzing the backend application database, extracting application logics, carefully designing the dynamic interactions in web environment and the screen presentation to make it more attractive and helpful for customers. Textual data on the web pertaining to a product or a service has been created to be in a human readable form. What is needed in the art is a process of building spoken dialog services by leveraging the wealth of information on companies' websites. In this manner, the investment in a detailed and organized website can be leveraged to service customers with a spoken dialog interface either over the phone or through the Internet.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In general terms, the invention disclosed herein may be referred to as "Webtalk." WebTalk is a general framework for automatically creating spoken and text-based dialog applications based on web information alone. Webtalk can instantly create dialog services by automatically learning task knowledge and mining information from web documents of a given website. Website understanding, which involves website structure analysis, webpage structure analysis, webpage information classification and information extraction is central to this task.

One embodiment of the invention relates to a method for providing a dialog interface for a website. The method comprises at each node in a website, computing a summary, a document description and an alias. A dialog manager within a spoken dialog service utilizes the summary, document description and alias for each website node to generate prompts to a user, wherein nodes in the website are matched with user requests. In this manner, a spoken dialog interface to the website content and navigation may be generated automatically.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 shows a screen shot of a website analyzed according to the present invention;

FIG. 4 illustrates a dialog with a spoken dialog service generated according to the present invention;

FIG. 6 illustrates an example maximum information covering algorithm according to an aspect of the present invention;

FIG. 8 illustrates an HTML page segment and two example realization codes.

DETAILED DESCRIPTION OF THE INVENTION

As mentioned above, a shorthand name for the present invention is Webtalk. However, use if this name should not be limiting in any way and the details of the invention will be set forth herein.

Webtalk automatically builds dialog services by exploiting the content and structure of websites. The goal is for WebTalk to operate as a virtual customer service or a Help Desk representative, interacting with the user in a natural language dialog. Rather than having users scan through a website for their answers or solutions, WebTalk provides them directly. This also enables the customer care applications to be tightly synchronized with changes on web pages. Furthermore, since the approach to building a dialog does not require any human intervention, developers can quickly create a new dialog service from one application to another. The techniques disclosed herein apply to creating voice-enabled helpdesk services, customer care services, natural language-based Web Navigation, search engines, web crawlers etc. It will provide new opportunities for building complex dialog services and enable more widespread use of speech, natural language (NL), and dialog technologies at a lower cost.

Figure 1:
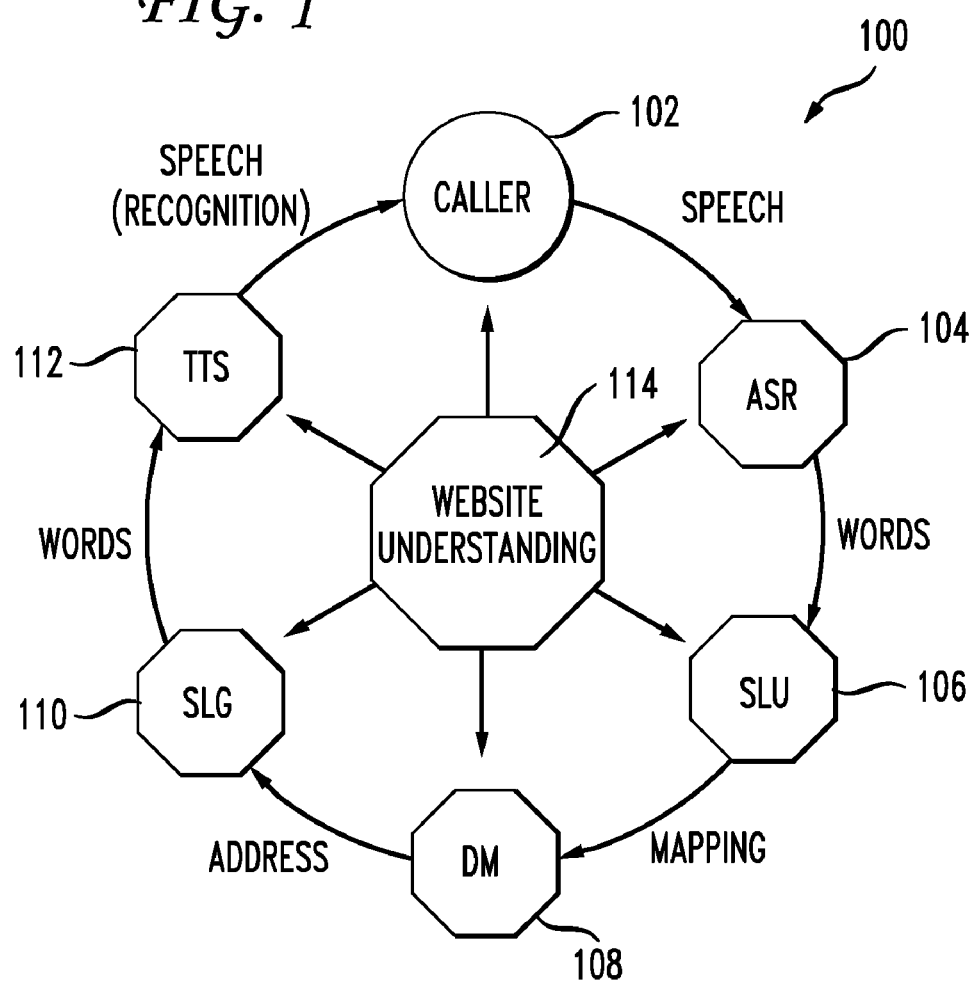
FIG. 1 illustrates a basic spoken dialog service including the website understanding module.

In order to achieve such a goal for automatically building spoken dialog systems, there are a number of approaches taken by WebTalk. As shown in FIG. 1, a spoken dialog system 100 consists of five major components for engaging in a dialog with a user 102, namely Automatic Speech Recognition (ASR) engines 104, Spoken Language Understanding (SLU) module 106, Dialog Manager (DM) 108, Language Generation (LG) 110, and the Text-To-Speech synthesizer (TTS) 112. As FIG. 1 shows, WebTalk contains an additional component: Website Understanding 114, which analyzes a given website including all its files and constructs task knowledge for all other components.

The main issue is that a website doesn't contain structured dialog-oriented task representation, in-domain real conversation data and in-domain speech data, which are a prerequisite for building an application-specific dialog system using our current technologies. Research challenges in WebTalk include constructing language models that reflect human-machine-like interaction by using web data, building natural language understanding models that require no hand-editing or annotation, constructing application-specific dialog models based on unstructured and structured task data on websites, designing a language generation component in a manner that can intelligently present the system's knowledge state, and building a good quality web-based task-specific speech synthesis component.

This disclosure presents an approach to creating a WebTalk application and discusses an example method of automated task knowledge extraction from given websites. Disclosed below is an overall view of the system and a detailed description for website understanding, including website structure analysis, web document representation, web document segmentation and information classification, as well as website-based information extraction.

Figure 2:
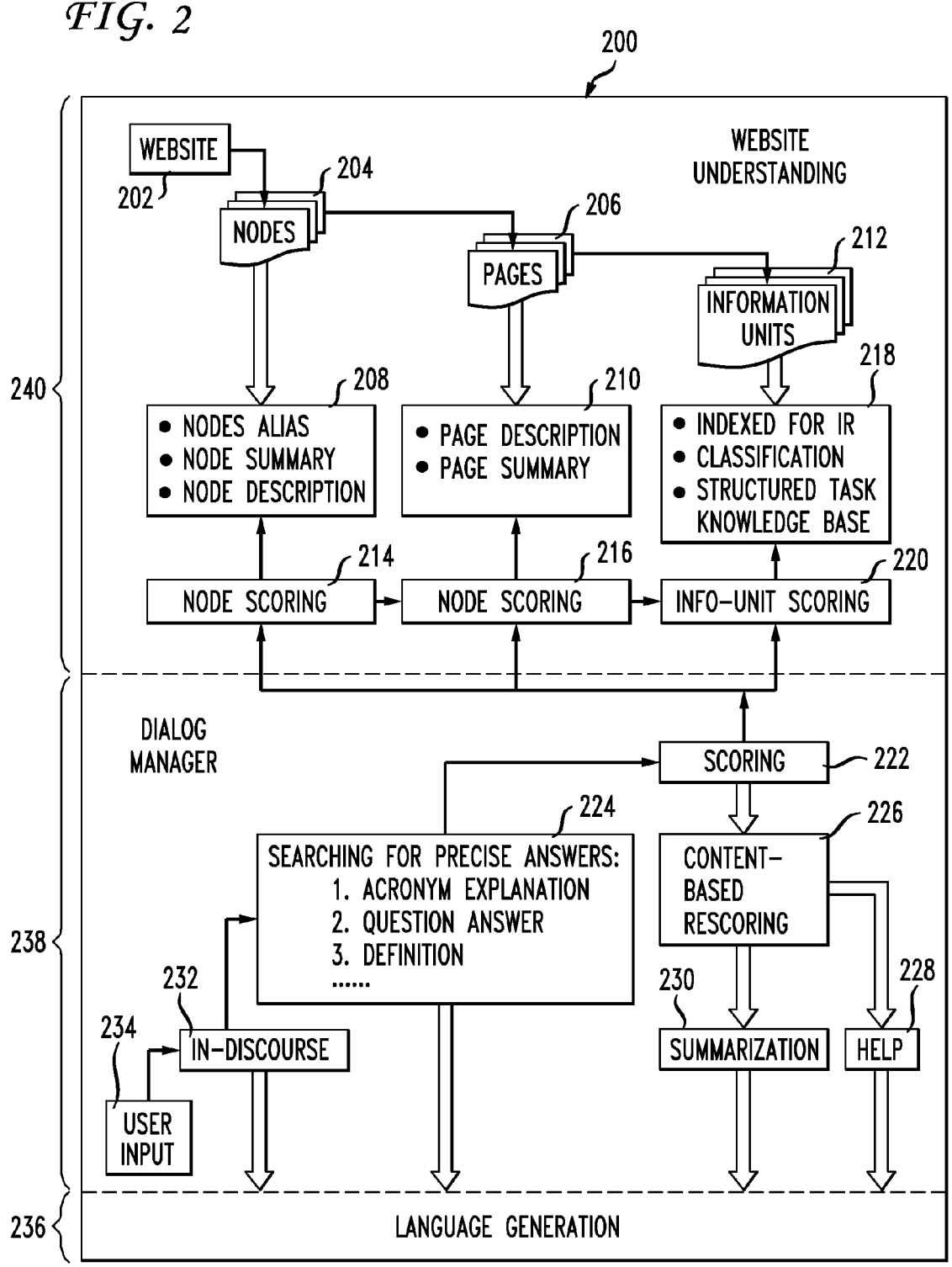
FIG. 2 illustrates the system architecture for an embodiment of the present invention.
Figure 3:
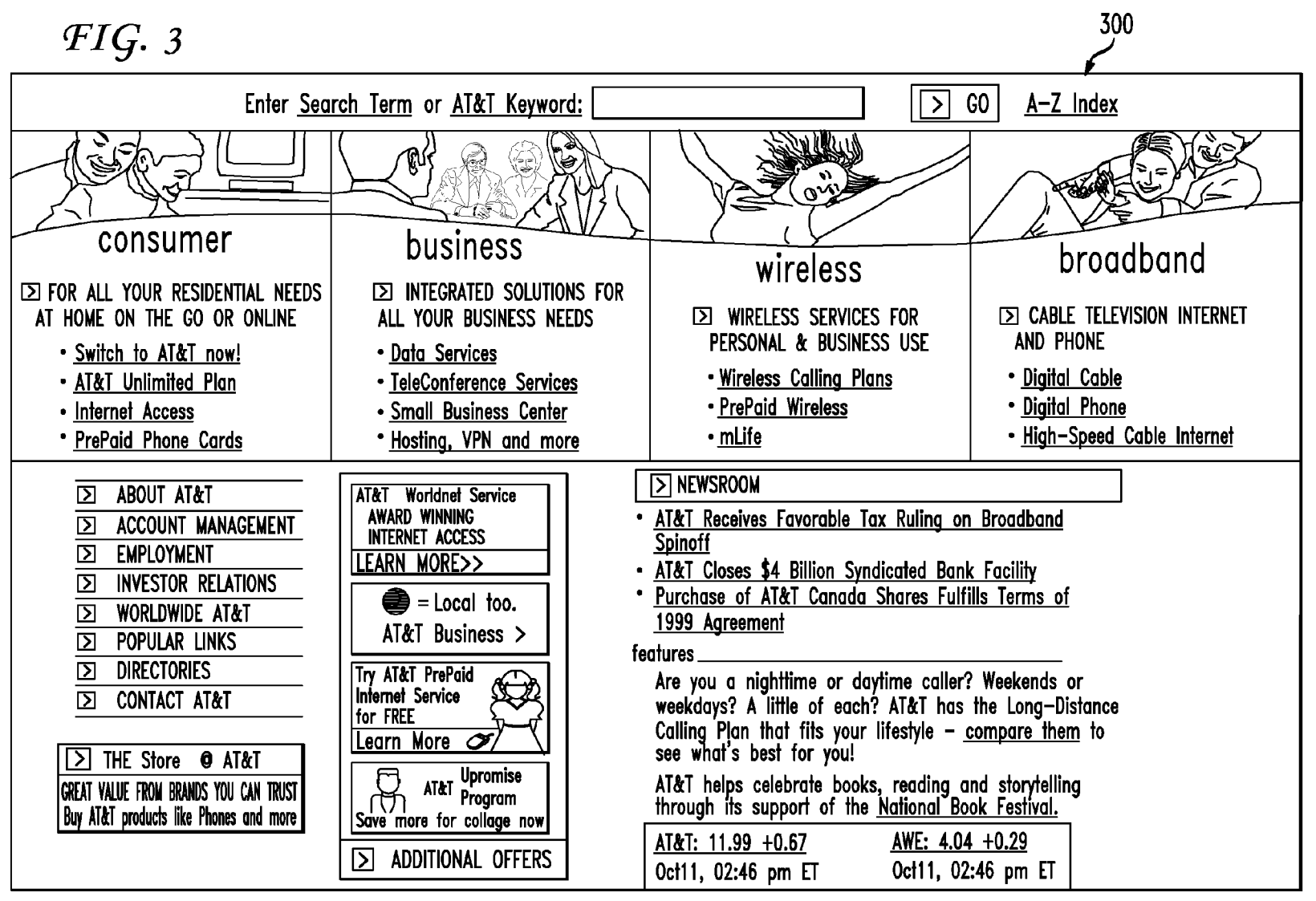

FIG. 2 shows a diagram of the system structure 200 for a version of WebTalk. At the top level, this architecture consists of three partitions: Website understanding 240, Dialog Manager 238 and Language Generation 236. Website understanding takes a given website (an example entry page 300 is given in FIG. 3) including all documents on this site as its input and outputs different levels of task information. Dialog manager takes the user's input and calculates an answer using all the task information built by the website understanding component 240 and the dialog context. Language generation 236 is responsible for converting the output from dialog manager 238 to natural language.

Figure 5:
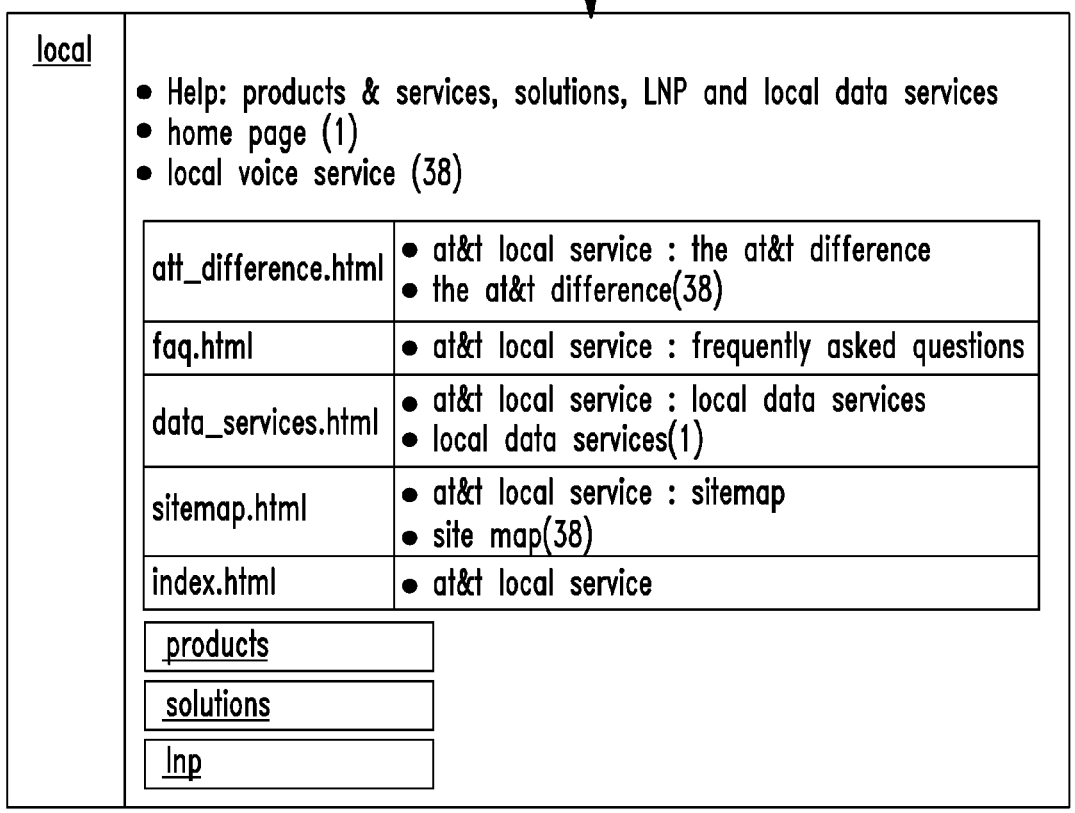
FIG. 5 illustrates a structure graph of a website analyzed according to an aspect of the present invention.

FIG. 4 shows a dialog sample 400 between the user and WebTalk built from www.att.com/local. In WebTalk (referring back to FIG. 2), task information is acquired at multiple stages: the website 202, website nodes 204, web pages 206, information units 212 and structured task knowledge base 218. A website 202 is quite different from a plain ad hoc file collection, since commonly all documents on a website are organized into a hierarchical structure and are woven together with hyperlinks. FIG. 5 shows one part of this structure for www att.com. A website node 204 can be simply considered as a physical path of this website 202, some paths are ignored if they are not destinations of any hyperlink or don't contain HTML pages. For each node 204, a node summary 208, a document description and an alias are computed at this stage 208. These are built for enabling the DM 238 to initialize conversations, provide context-based help prompts and match nodes with user's questions. Algorithms behind these computations, the detailed explanation for FIG. 5, and the specific ways for the DM 238 to utilize this knowledge will be described below.

For each web page 206, a description document is created by considering its title, its headline, its meta words and its links. The webpage summary 210 simply comes from the page's first descriptive information block (which is not a menu) an image label, a prompt for the input field or other short passages. As we observe in FIG. 3, an HTML page may have complicated layouts and is often assembled with multiple information units. Each information unit 212 is either a coherent topic area according to its content or a coherent functional area according to its behavior. An information unit 212 is also often a visual block displayed on an Internet browser. Humans can successfully use visual cues and language cues to identify them.

In order to segment an HTML page into smaller information units 212, WebTalk uses a variety of clues, including webpage structure features as well as a series of subtle features, such as visual features, geometric features, behavior features and context features. A more detailed description follows.

Each information unit 212 is judged and assigned a symbol to describe its function. For example, in FIG. 3, "Enter search terms or AT&T keywords" 302 should be identified as a prompt area for the input box. An information unit may also be a database—like data area, a pair of topic and explanation, and so on. Once these small information units are correctly extracted and classified, information matching strategies and dialog modules can be separately tailored for different information types. Duplicate passages are deleted in this process.

A structured task knowledge base 218 is prepared for the DM 238 to answer users' questions precisely. Examples of information contained in the knowledge base include a list of product and service names, their definitions, their feature descriptions, their prices, and relationships between products and services. It also may include pairs of question-answers as well as pairs of acronym-explanations. An abundant task knowledge base will evidently strengthen the system's intelligibility. WebTalk finds pairs of acronym-explanations and pairs of question-answers, which are intentionally prepared by webpage creators. WebTalk also extracts product and service names for most company websites and extracts concise definitions or descriptions for them.

The Dialog Manager (DM) 236 takes the user's input 234 and replies with a natural language answer. The interactions with DM 238 can be classified into the following types: (1)

Task-independent greetings. (eg: hello, hi, thanks, bye, etc.); (2) Commands to the system (eg: restart, repeat, speak slowly please, etc.); (3). In-discourse dialogs 232. For these questions, the system can provide the appropriate answer only by referring to the dialog context instead of referring to task knowledge; (4) Interactions with the structured task knowledge base: DM 236 tries to precisely and directly answer the user's question using structured task knowledge base 224, which has been previously extracted from web documents. WebTalk includes three modules to support this type of interactions, which are respectively responsible for explaining acronyms, answering users' questions using FAQs on the website, and answering definition questions 224; (5). General task oriented interactions: When the system fails to work out an acceptable answer by the above modules, it resorts to information retrieval (IR) technology. Traditional IR techniques are extended which measure the similarity between a question and a document based on word frequency, using a number of language processing techniques and guidance from high-level task knowledge. The language processing techniques and resources include pos-tagging, synonym tables, morphological table, and collocations. Using the part of speech (pos) for each term (salient words or phrase), the system assigns higher weights to noun-terms in the information retrieval process. Morphological knowledge is used to normalize salient terms. A synonymy table is employed to extend the terms. Collocations are applied to emphasize the importance of long terms. In addition, slightly different metrics are used for matching different types of information units for the same questions. Guidance from task knowledge helps to determine which words are less useful and which words are more important in the context of this task. As FIG. 2 shows, IR is employed at multiple stages. On one hand, matching nodes and pages with questions can reduce the scope for searching small information units. On the other hand a good match between questions and pages or nodes can lead to a direct answer which comes from page summaries or node summaries. Then the system uses dialog context to rescore candidate answers retrieved from IR. If the best answer's final score is above a threshold, a summarization (when the answer is long) technique 230 is applied to provide a succinct response. Otherwise, the system will provide a context-based help prompt or prompt for retry 226, 228.

As shown in FIG. 2 as well, there are various parts of the system in which node scoring 214, page scoring 216 and info-unit scoring 220, referenced from a more general scoring 222 component, that provide information regarding each respective node, page and information unit for use in extracting the content from the website 202.

The language generation 236 component of Webtalk is responsible for refining the text output of the DM to be dialog-style natural language prompts. The tasks include: (1) presenting the answer more concisely. For this purpose, an algorithm is developed to perform query-relative summarization, which chooses sentences from a long answer based on relevance of sentences to the query and the degree of continuity between the chosen sentences; (2) converting a web-suited written natural language string into a dialog-type string; (3) translating table-based knowledge to natural language. Templates are manually created and used to realize a natural language explanation for some particular types of questions.

Language generation 236 can either use sentence patterns to translate the feedback from the DM 238 to natural language or can simply reedit the returned passage by substituting or deleting words which are already written in natural language but are only useful for an internet browser user.

FIG. 4 provides an example dialog 400 between the user and the system which takes www.att.com/local as its task knowledge. The first turn is a general system prompt "Hi this is _____. How may I help you?" is a sentence template. The phrase "AT&T local services" was automatically extracted from the website. The second turn is a simple in-discourse reply for dialog continuity. The third turn includes a context-based system help prompt. The forth turn explains an acronym. The fifth comment gives an answer by referring to the dialog context. The sixth is recognized as a task-independent common dialog event. The seventh reply shows the system's abilities in language generation. The eighth answer comes from summarizing a matched information unit.

Next is presented an approach to information extraction or website understanding from a website, which includes website structure analysis, web documents representation, web document segmentation and information classification.

A website is more structured than the web. Web documents on a website are often organized in a hierarchical physical structure and cross-linked with the help of hyperlinks. Hyperlinks (or citations) are being actively used in web search engines, web crawlers, webpage classifications and web-based question answering systems. A hyper link has two components: the destination page and the anchor text describing the link. The belief is that these anchor texts have greater discriminative and descriptive power that the text in the target document itself. Physical website structure is used as a cue for website understanding by WebTalk. Webtalk treats this structure as a subjective topic classification tree made by task experts.

FIG. 5 shows a component 500 of the structure of www.att.com/local, which is the sub node of www.att.com labeled as 'local'. Accordingly, 'product', 'solution', and 'LNP' are sub nodes of 'local'. The rest of the HTML files in FIG. 5 are the immediate sub pages of 'local'. For each node and each page, its linking relationships with other pages are collected. For instance "AT&T differences (38)" means "AT&T differences" have been used as anchor texts 38 times for www.att.com/local/att_difference.html. This analysis is repeated at each level of the respective website. In some instances, where the invention is used to generate a spoken dialog service for other applications besides just a website, such as for a search engine or webcrawler, the analysis is repeated in whatever patterns is appropriate for identifying websites or webdata for analysis according to the principles of the invention.

For each node of a website, a system computes a summary, a document description and an alias. The document description simply consists of anchor texts of all links pointing to this node. Among them, the best representative anchor text is chosen as the alias. The summary is calculated using an algorithm that summarizes nodes, initializes variables, and repeatedly chooses data to add to a summary of the website for use by the spoken dialog interface for generating prompts to interact with the user. These components of this summary calculation are disclosed more fully next.

In order to produce a concise summary for each website node, an example algorithm for node summarization is referred to as the Maximum-Information Covering algorithm 600 shown in FIG. 6. The main idea is to choose a list of anchor texts, which are descriptive and can cover important and most of the content beneath a give node. The algorithm receives three parameters as its input: a node (N), the maximum allowable number of information items (L), and the term table (T). L defines how many anchor strings can be acceptably listed in the summary. Term Table contains a list of keywords and key phrases as well as their properties, such as parts of speech and salience score. In FIG. 6, $S^{(N)}$ is the summary field and initialized to be empty. Token$^{(N)}$ contains a set number $\{t_1\}$, which are assigned using formula (2) below. Token weights ($tw_i$) are computed using formula (1) below, where $P_N$ equals the total page number under Node N, $P_N(i)$ returns the total page number under the i'th sub-node of N.

$$lw_j = c * \frac{P_N(i)}{P_N} + d = \text{Linked\_byEntry}(i) \quad (1)$$

$$t_i = L * \frac{lw_i}{\sum_j lw_j} \quad (2)$$

$$wl_{ij} = \frac{\text{N\_Terms}(s_{ij}, T)}{\text{N\_Terms}(s_{ij}, T) + \text{N\_Words}(s_{ij})} * \text{Has\_NounTerms}(s_{ij}, T) \quad (3)$$

$$w_{ij} = wl_{ij} * \left( a * lw_i + b * \left( \frac{f_{ij}}{\sum_k f_{ik}} + e_{ij} \right) \right) \quad (4)$$

Linked_byEntry(i) tells how often the i'th sub node is referenced by the entry pages. The letters c and d are two positive constants. Intuitively, the more pages the i'th sub node encloses and the more frequent the i'th node is referred by entry pages, the higher the value will be assigned to $t_i$.

$A^{(N)}$ is a set of tuples for describing hyperlinks belonging to N and corresponds the j'th hyperlink of the i'th sub node of the node N.

$$A^{(N)} = \{a_{ij}\}, a_{ij} = (s_{ij}, f_{ij}, e_{ij}, w_{ij}) \quad (5)$$

Where i stands for the sub node order, j represents the link order. The variable $s_{ij}$ is the anchor-test of $a_{ij}$. The variable $f_{ij}$ equals the frequency of $a_{ij}$ and $e_{ij}$, is a Boolean value and tells if this link is used by the entry page of this node or used by the home page of this website. The variable $w_{ij}$ is a weight associated with this link and $w_{ij}$ is initialized using formula (3)(4). Basically, $w_{ij}$ is proportional to $tw_i$, $e_{ij}$, and $wt_{ij}$. The variable $wt_{ij}$ is evaluated based on the term density of $s_{ij}$, which equals the percent of salient words in $s_{ij}$ relative to the total words in $s_{ij}$, and if $s_{ij}$ contains a noun term (the second item of formula (3). For example: in FIG. 5, $a_{11}$=(the AT&T difference", 38, 1, $w_{11}$), $a_{31}$={"local data service", 1, 0, $w_{31}$}. That $w_{11}$ equals 0 means $a_{ij}$ is not eligible to join the summary.

After initialization, the outer loop of this algorithm repeatedly chooses $a_l$, with the highest weight, rewrites it as $a_{mn}$, adds its anchor text into the summary field $S^{(N)}$, subtracts 1 from $t_m$, removes $a_{mn}$ from $A^{(N)}$ and removes $a_{ij}$ from $A^{(N)}$ when the i'th sub node has used up his tokens ($t_i$) or $s_{ij}$ and $S_{mn}$ are same in terms of salient works they contain.

The following text provides an example of summary texts for various webpages:
 www.att.com/local:
  products & services, solutions, lnp and local data services
 www.att.com /local/products:
 centrex, AT&T primeplex, AT&T primecodes, t1 access, AT&T prime digital trunk, AT&T prime nbx, AT&T primeconnect, AT&T primepath nbx, AT&T primemail, AT&T primelink, AT&T digital link, AT&T primexpress and service enhancements
 www.att.com/local/solution:
  business communication goals, business profile and business telephone systems
From this example summary, one can identify how the summary string, "products and services, solutions, and local data services" was used in the dialog sample 400 in FIG. 4.

Extracting valuable information from web pages is a common challenge among web-based information applications including web-based question answering, web-based Knowledge Assistants, Wrapper Technology, voice enabled web surfing tools as well as Web Talk. The development of XML, VoiceXML and Semantic Web shows the interest in this area of technology.

An HTML page is designed for rendering a two-dimension image. Its content is often multi-layered and often contains multiple information blocks as it is clearly seen in FIG. 3. The present invention involves extracting these information units from an HTML page and classifying them to predefined categories in terms of their functions and mutual relationship. These information units would be useful in constructing web information class (WIC)-based language models, developing WIC-based language models, developing WIC-based language generation. This task is referred to as Web Document Understanding. It entails document representation, document segmentation, information classification as well as structured task information extraction. What follows is a feature-vector representation approach to HTML documents. Based on this representation model, a preliminary mathematical framework is introduced for web document understanding. It is understood that other documents based on variations or improvements of HTML may also be analyzed according to this approach. Therefore, it is not limited to any specific version of HTML or to HTML itself.

Figure 7:
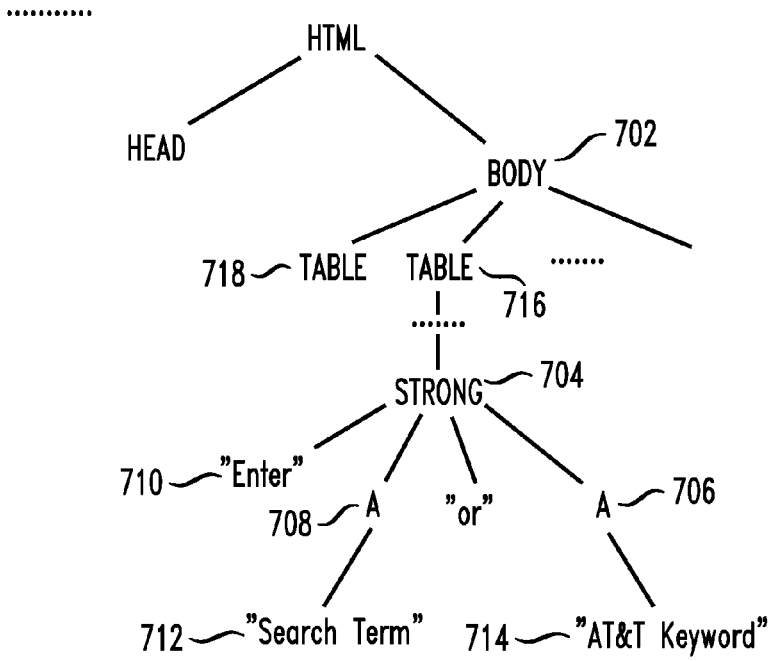
FIG. 7 illustrates a sample HTML implementation of a webpage.

An HTML document consists of a head section and a body section. The title of the document along with other description information about the document appears in the head, and the content of the document appears in the body. FIG. 7 shows one portion 700 of the real HTML implementation and the element-tree representation of FIG. 3.

The element-tree representation is a popular model for HTML documents. It is naturally built from the nested structure of HTML source codes, as FIG. 7 shows. Each tree node is either an element node or a text node. Each element node (e.g. 702, 704, 706, 708) has zero or more child nodes, contains tag name (such as 'a', 'strong', 'body', etc) as well as zero or more attributes ('color', 'size', 'width', etc). All tags and most attributes are string valued. HTML 4.1 specifies 91 element types. All text nodes (e.g., 710, 712, 714) are leaf nodes, such as "enter" and "search term". It is often that multiple contiguous or non-contiguous text nodes collaboratively render an information unit (IU), for example "enter search term or AT&T keywords" is an information block on the screen, but resides in four text tree nodes.

The element-tree focuses on very detailed display features for each text node, but doesn't define their functions and relationships among them. Picking an HTML document representation model, which is suitable for computing and stresses the cues that humans often use to understand HTML pages, is an important component of WebTalk. These cues include document structure features, text visual features, geometric features, behavior features, environment features and content features.

Document structure feature encodes the way that the content of a document is organized. Each HTML page is written with a structure in mind, which when incorporated with context, produces the direction into which the reader is guided. However, extracting and describing the document structure is not an easy task for machines. Experiments reveal that the vast majority of HTML pages use 'table' as immediate child nodes (e.g., 716, 618) of 'body' 702 to shape the first level document structure. Statistical evidences are shown in Table 1.

TABLE 1

Distribution of 'table' in HTML documents

| Website | Pages | Pages using 'table' | Words under 'table' | 'table' child nodes of 'body' |
|---|---|---|---|---|
| lexmark.com | 1774 | 99% | 93% | 81% |
| cnn.com | 1732 | 98% | 97% | 71% |
| att.com | 4357 | 94% | 66% | 60% |

Three numbers are used to show the importance of 'table', for example ninety-eight percent of pages on cnn.com contain 'table' as its element nodes, seventy percent of immediate child nodes of 'body' in all pages on cnn.com are 'table', ninety-seven percent of text content on cnn.com are encompassed by 'table'. This phenomenon happens more frequently on complex pages. Webpage developers typically use 'table' to structure a complex page. Based on the above observation, the system calculates a structure code for each leaf node of the element tree. A structure code is zero or a concatenation of triples: 'a.b.c:d.e.f', where a is the physical order of 'table' (tables which don't contain text nodes are ignored), b is the order of 'tr' which don't contain text nodes are ignored), b is the order of 'tr' ('tr' represents rows), c is the order of 'td' ('td' represents columns) and ':' stands for the concatenation. For example, in FIG. 7 "enter", "search term", "or", and "AT&T keywords" are assigned the same structure code "1.1.2:1.1.1:1.1.1" which means these strings reside in a same third-level table cell.

Text visual features include color, font and size. Geometric features include horizontal position and vertical position for each text node. Tag, parent tags, client-logic (java script, etc), and sever-logic (cgi script, etc) collaboratively define behavior features for text-nodes and non-text nodes. Environment features of a node are achieved from its physically surrounding nodes. Content features for text nodes include the length of text and its semantic features. One part of the feature table for FIG. 7 is given in Table 2.

Each row of this table corresponds to a leaf node of the element tree. Each text node has a natural order in the leftmost cell. Non-text nodes are kept as environment features for contiguous text nodes. The encoding of this representation for webpage segmentation and information classification will be discussed below.

It was investigated how these features contribute to web page segmentation and information classification. One hundred pages are randomly chosen from AT&T website (www . . . att.com/). Eighty of them are treated as training data; the rest twenty pages constitute test data. Labels were assigned to all text nodes of all these pages. The following gives an example label file.

| 0 | 4 | Prompt |
|---|---|---|
| 5 | 6 | menu |
| 7 | 13 | menu |
| 14 | 25 | menu |
| 26 | 31 | menu |
| 32 | 32 | menu |
| ... | | |

For instance, "0 4 prompt" means five text nodes from the first to the fifth form a prompt area for an input field. As is observed from Table 2, each text node has a physical order number. For labelers' convenience, all these pages are automatically reedited by adding an order number beside each text. For example: "Enter search term of AT&T keywords" will be changed to: "0:Enter 1:Search term 2: or 3: AT&T keywords 4: ." on the screen. Annotators can easily identify the boundaries between information blocks and their functions. "explanation", "information garbage", "list", "menu", "short passage", "option", "prompt", "table data", "topic", and "headline" are predefined information classes. All these pages are annotated manually and the detailed number of examples for each class is listed in Table 3.

TABLE 2

An example feature table

| No | structure code | tag | Parent tags | text | Color | size | position | link | server logic | Client logic |
|---|---|---|---|---|---|---|---|---|---|---|
| | 1.1.1 | img | | | | | 0, 0 | | | |
| | 1.1.1 | img | | | | | 0, 0 | | | |
| 0 | 1.1.2:1.1.1:1.1.1 | strong | span p | Enter | #000000 | 4 | 0, 0 | | http://search.att.com/cgi-bin/ake.cgi | |
| 1 | 1.1.2:1.1.1:1.1.1 | A | strong span p | Search Term | #000000 | 4 | 0, 0 | http://search.att.com/ | http://search.att.com/cgi-bin/ake.cgi | |
| 2 | 1.1.2:1.1.1:1.1.1 | strong | span p | Or | #000000 | 4 | 0, 0 | | http://search.att.com/cgi-bin/ake.cgi | |
| 3 | 1.1.2:1.1.1:1.1.1 | A | strong span p | AT&T Keyword | #000000 | 4 | 0, 0 | /att_keywords/faqs.HTML | http://search.att.com/cgi-bin/ake.cgi | |
| 4 | 1.1.2:1.1.1:1.1.1 | span | p | : | #000000 | 1 | 0, 0 | | http://search.att.com/cgi-bin/ake.cgi | |
| | 1.1.2:1.1.1:1.1.2 | input | | | | | 0, 0 | | http://search.att.com/cgi-bin/ake.cgi | |
| | 1.1.2:1.1.1:1.1.3 | input | | [Gu] | | | | | http://search.att.com/cgi-bin/ake.cgi | |
| 5 | 1.1.2:1.1.1:1.1.4 | strong | a p | A-Z Index | #000000 | 4 | 0, 3 | /atoz | http://search.att.com/cgi-bin/ake.cgi | |

TABLE 3

| Frequency of information types | |
|---|---|
| Type | Frequency |
| explanation | 423 |
| topic | 381 |
| menu | 271 |
| short passage | 243 |
| list | 101 |
| option | 24 |
| table-data area | 23 |
| headline | 9 |
| information garbage | 8 |
| prompt | 214 |

WebTalk assumes that each HTML page is a realization of a sequence of information classes. The role of a webpage decoder is to affect a mapping between feature tables to the wanted underlying symbol sequences. Three problems make this very difficult. Firstly, the mapping from symbols to HTML realization is not one-to-one; there are large variations in realizing the same functional web page due to page developers' habits and creativity. For example: FIG. 8 shows an HTML page segment 802 and its two very different realization codes 804, 806. Secondly, the boundaries between symbols cannot be identified explicitly from the feature table. Thirdly, a major characteristic of webpage analysis is the high dimensionality of the feature space, which makes planning a rule-based webpage analyzer very hard.

Let an HTML page $P_n$ with T text nodes be represented as two sets of vectors:

$$P_n = \{D_n, L_n\}$$

$$D_n = \{d_1^{(n)}, \ldots d_t^{(n)} \ldots, d_{(T-1)}^{(n)}\}$$

$$L_n = \{\mathbf{1}_{i,j}^{(n)}\}$$

Where $d_t^{(n)}$ is the difference-vector between the t'th and the (t+1)'th text node, $\mathbf{1}_{(i,j)}$ is the description vector for the text nodes from i to j. For training pages, each (i,j) corresponds to a labeled information block. For example, referring to the segment transcription file for www.att.com/index.html shown above, (i,j) belongs to $\{(0,4),(5,6)(7,13)(14,25), \ldots\}$, each $d_i^{(n)}$ (i>0) is an information boundary. For test pages, these boundaries need to be identified first.

TABLE 4

| Parameters for difference vectors | | | |
|---|---|---|---|
| Parameter | Dim | Explanation | Example: $d_4$ in Table 2 |
| Tags_1 | 91 | All non-text tags between two consecutive text-nodes | (0, ... input = 2.0 ...) |
| Tags_d | 91 | Difference between tags and parent tags of two consecuative nodes | (a = 1.0 ... span = 1.0 ... strong = 1.0 ...) |
| Position_d | 2 | Difference between the positions of two consecutive nodes | (0, 3) |
| Node_1 | 1 | the number of non text-nodes between two consecutive text nodes | (2) |
| Size_d | 1 | Difference between the size of two consecuative nodes | (3, 3) |

TABLE 4-continued

| Parameters for difference vectors | | | |
|---|---|---|---|
| Parameter | Dim | Explanation | Example: $d_4$ in Table 2 |
| Color_d | 3 | Difference between color numbers of two consecutive nodes | (0, 0, 0) |
| Code_d | 1 | Distance between the codes of two consecutive nodes | (1) |

The purpose of encoding the data is to parameterize the raw feature table into these sequences of feature vectors. A difference-vector $d_t^{(n)}$ consists of 190 real value elements and consists of parameters shown in Table 4.

A description vector $\mathbf{1}_{(i,j)}$ is represented as a 277-dimensional vector and involves parameters listed in Table 5.

TABLE 5

| Parameters for description vectors | | | |
|---|---|---|---|
| Parameter | Dim | Explanation | example: $1_{(0,4)}$ of Table-1 |
| Tags | 91 | percent of the frequency of each tag relative to the number of nodes from i to j | (a = 2/5.0, ... p = 1,0 ... span = 1, sstrong = 0.8, 0 ...) |
| Tags_W | 91 | percent of the words under each tag relative to all words from i to j. | (a = 0.57, 0, ... p = 1,0 ..., 0, span = 1, strong = 0.86, 0..) |
| Tags_R | 91 | the frequency of each tag of non text nodes from j to j + 1 | (a = 0, ... input = 2,0 ... ) |
| Size | 1 | Average size of all text nodes from i to j | (3.6) |
| Table_Pos | 1 | the relative position of the table that the information block (i, j) lies in | (0.0%) |
| Pre-words | 1 | percent of words before (i, j) relative to all words in the page | (0.0%) |
| Word_Len | 1 | The number of words from i to j | (7) |

To accomplish boundary detection, in the learning stage, all difference-vectors $(d_t^{(n)})$ of training pages are split into two sets: B, B̄.

$$B = [d_{t1}], d_{t1}^{(n)} \text{ is a boundary, } t1 > 0$$

$$\bar{B} = [d_{t2}^{(n)}], d_{t2}^{(n)} \text{ is not a boundary}$$

Given a test HTML page represented as $P_m$ and its difference vectors $\{d_t^{(m)}\}$, $d_t^{(m)}$ is identified as a boundary if it is closer to B than to B̄. The distance between $d_t$ and a set B or B̄ is given in (7).

$$p_t^{(m)} = \frac{F(d_1^{(m)}, B)}{F(d_1^{(m)}, \bar{B})} \tag{6}$$

$d_1^{(m)}$ is accepted as a boundary, when $p_t^m < 1$.

$$F(d_1, B) = \min_{i1}\left(1 - \frac{\langle d_i \cdot d_{i1}\rangle}{\|d_t\| \cdot \|d_{t1}\|}\right) d_{t1} \in B \tag{7}$$

TABLE 6

The performance of boundary detection

| Parameters | P1 | P1, P2 | P1, P2, P3 |
|---|---|---|---|
| Hit Rate | 19.67% | 48.7% | 59.01% |
| False Alarm Rate | 1.23% | 1.23% | 1.63% |

Table 6 shows a comparative study of feature selection for boundary detection. The contribution of feature sets (P1, P2, P3) could be evidently observed. P1={Tags_I}, P2={Tags_d}, P3={Position_d, Node_I, Size_d, Color_d, Code_d}. As more training data become available, a number of sophisticated mathematical models may be introduced to solve this problem, such as HMM, SVM.

This section focuses on classifying information blocks to information types (or symbols) listed in Table 3. First an empty vector is set for each information type, C corresponds to 'explanation', $C_2$ corresponds to 'topic', accordingly $C_{10}$ corresponds to 'prompt'. In the learning stage, all description-vectors $(d_{(i,j)}^{(n)})$ of training pages are collected into its corresponding vector set $C_c$ as the labeling file indicates. Compute the average vector for each class and add it to the associated vector set.

For a test stage, each of its information blocks $l_{(i,j)}$ is assigned to an information type $c_{(i,j)}$, which is considered as the closet one to $l_{(i,j)}$ according to the distance $F(l_{(i,j)}, C_c)$. The formulas are below:

$$c_{(i,j)} = \arg\min_c [F(l_{(i,j)}, C_c)] \quad (8)$$

$$F(l_{(i,j)}, C_c) = \min_{(i1,j1)} \left(1 - \frac{\langle I_{(i1,j1)} \cdot I_{(i,j)} \rangle}{\|I_{(i1,j1)}\| \cdot \|I_{(i,j)}\|}\right) \quad (9)$$

$$I_{(i1,j1)} \in C_c$$

$$I_{(i,j)} = \begin{cases} 1 + \log(I_{(i,j)}) & I_{(i,j)} > 0 \\ 0 & I_{(i,j)} = 0 \end{cases} \quad (10)$$

In both the training stage and the testing stage, all elements of $l_{(i,j)}$ are converted to a log value using formula (10). This conversion intends to bring the variety of elements to be in similar range.

The following accuracy of information classification in two conditions: knowing the boundaries and not knowing the boundaries. For the accuracy parameter, if boundaries are labeled correctly, provides a performance of 74.6% and when not knowing the boundary, the performance is 57.2%. This result means if the boundaries are given correctly, 74.6% of information blocks can be correctly assigned an information class symbol. When combining boundary detection with information classification into one process, 57.2% of information blocks can be correctly recognized.

This disclosure describes WebTalk, a general framework for automatically building spoken dialog services from a given website. This technology enables companies, which have already set up their websites, to extend their customer service with a spoken dialog interface whether over the phone or through the Internet. In order to conquer the challenges confronting WebTalk, a variety of techniques have been integrated into this system, including Information Retrieval, Entity Extraction, Morphological Knowledge, Semantic Knowledge (Synonyms, etc.), Language Modeling, Pos-tagging, Summarization, automatic document analysis, and prevalent dialog technologies.

Automated task information extraction or website understanding from a given website is an advantage of WebTalk. Website structure can be used for information extraction. The basic idea is to explore the physical structure and the hyperlinks of a given website, which are defined by web page creators and assumed to convey relationship between pages and comprehensive task knowledge. An example algorithm is presented for summarizing website nodes. Secondly, a feature vector representation approach for HTML documents is presented and a preliminary mathematical framework is built based on this representation for segmenting web pages and classifying information blocks. The statistical models utilized with Webtalk addresses the weaknesses in other approaches that use rule-based webpage segmentation requiring editing of rules. Translating an HTML page to a feature table and then encoding this table by real valued vectors provides a benefit for the present invention. The key difference between this representation and previous ones is that in this method an HTML document is treated as a sequence of feature vectors. The basic idea disclosed herein provides the ability of introducing mathematical models to analyze web documents. The present invention demonstrates the efficiency of the parameterized HTML document representation in webpage segmentation and information classification. A number of sophisticated classification and decoding approaches are also contemplated as part of the invention, such as providing deeper analysis of web pages for web-based applications, such as searching engines, web crawlers, question answering, and discovering and organizing web communities.

The principles of the present invention may provide either an interface to a website or the internet via an exclusive voice-interface or a combination of a voice interface and a standard mouse, keyboard, stylus or other interface for interacting with the Internet. For example, one contemplated use of the present invention is a multi-modal voice-interface to a web-site. Using the above process to automatically analyze a website, a voice-enabled dialog service may provide an optional voice interface to the website that is available to the user via a button on the website. The particular client computing device, whether it is a desktop, laptop or other portable device, must have the microphone and speaker capability to receive speech and present synthetic TTS speech to carry on the dialog. In this regard, for a licensing fee, the website owner can provide an alternate voice interface for use by customers. This alternate interface may be selectable by the user via a selectable button.

The voice portal may be used in connection with the standard mouse or stylus interface to enable a user to navigate more quickly to desired information or to complete orders or information searches on the Internet. As nodes within the website are identified via the voice interface, the Webtalk application will interact with the website and also control the webpages presented to the user with accompanying prompts.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, there may be other summarization techniques for analyzing website structures and data other than the specific algorithm set forth above. Further, while HTML documents are referred to above, there are variations and improvements on the basic HTML protocol that may be developed for web design. These other structures are contemplated as applicable to the present invention. Accordingly, the appended claims and their legal equivalents should only define the invention, rather than any specific examples given.

We claim:

1. A system for providing a spoken dialog interface to a website in at least one of an HTML markup language and an XML markup language, the system comprising:
a first module controlling a processor to compute a summary for each respective node in the website based on a list of anchor texts, each anchor text in the list of anchor texts being in a hyperlink of another webpage that points to each respective node, each anchor text selected according to a term density associated with a percentage of salient words within a phrase relative to a total number of words in the phrase;
a second module controlling the processor to identify hyperlinks associated with each respective node and a weight associated with each respective hyperlink, wherein the weight relates to a percent of salient words in the anchor text of the respective hyperlink relative to total words in anchor texts of the hyperlinks associated with each respective node; and
a third module controlling the processor to use the hyperlinks, weights, and the summary for each respective node to enable the spoken dialog interface to interact with a user in a live spoken dialog, wherein nodes in the website are matched with open-ended user spoken input and prompts from the spoken dialog interface seeking the open-ended user spoken input are independent of the nodes in the website.

2. The system of claim 1, further comprising a fourth module controlling the processor to compute a document description and identify anchor texts of all links pointing to the respective node.

3. The system of claim 2, wherein an alias is computed with the summary, the alias comprising a best representative anchor text.

4. The system of claim 1, wherein the first module further receives a node identifier, a maximum number of information items associated with each respective node and a term table.

5. The system of claim 4, wherein the first module computes the summary using a maximum information covering algorithm.

6. The system of claim 5, wherein the maximum information covering algorithm identifies hyperlinks within a node that are eligible to join the summary.

7. The system of claim 6, wherein the hyperlinks within a node that are eligible to join the summary are hyperlinks with at least one noun term.

8. The system of claim 4, wherein the first module further:
initializes an available set of parameters associated with hyperlinks and subnodes of each respective node;
repeatedly chooses a set of parameters associated with hyperlinks of each respective node that has the highest weight from the available set of parameters; and
adds an anchor text associated with the chosen set of parameters having the highest weight to the summary.

9. The system of claim 8, further comprising:
a fourth module controlling the processor to remove the chosen set of parameters associated with the added anchor text from the available set of parameters.

10. The system of claim 9, further comprising:
a fifth module controlling the processor to remove a set of parameters from the available set of parameters when the associated subnode has used up its tokens.

11. The system of claim 10, further comprising:
a sixth module controlling the processor to remove a set of parameters from the available set of parameters when the anchor text of the associated subnode is equivalent to the anchor text in the summary in terms of salient words each contains.

12. A spoken dialog system for interfacing via natural language with a website in at least one of an HTML markup language and an XML markup language, the spoken dialog system comprising:
a first module controlling a processor, at each node of the website, to compute a summary for each respective node based on a list of anchor texts, each anchor text in the list of anchor texts being in a hyperlink of another webpage that points to each respective node, each anchor text selected according to a term density associated with a percentage of salient words within a phrase relative to a total number of words in the phrase;
a second module controlling the processor to identify hyperlinks associated with each respective node, wherein the weight relates to a percent of salient words in an anchor text of the respective hyperlink relative to the total words in anchor texts of all links pointing to each respective node; and a third module controlling the processor to use the identified hyperlinks, weights, and the summary for each respective node to enable interaction with a user in a live spoken dialog, wherein nodes in the website are matched with open-ended user spoken input and prompts from the spoken dialog interface are seeking the open-ended user spoken input are independent of the nodes in the website.

13. The spoken dialog system of claim 12, wherein the nodes in the website are matched with user input to enable the spoken dialog system to generate appropriate responses to the user input.

14. The spoken dialog system of claim 12, further comprising a fourth module controlling the processor to compute a document description and identify anchor texts of all links pointing to each respective node.

15. The spoken dialog system of claim 14, wherein an alias is computed with the summary and the document description, the alias comprising a best representative anchor text.

16. A system for providing a spoken dialog interface to a website in at least one of an HTML markup language and an XML markup language, the system comprising:

a first module controlling a processor, for each node within the website, to select a list of anchor texts that describe content beneath each respective node, wherein each anchor text is selected based on a term density associated with a percentage of salient words within a phrase relative to a total number of words in the phrase and on whether a respective anchor text contains at least one similar salient word to anchor texts already in a node summary comprise at least two anchor texts selected from the list of anchored texts;

a second module controlling the processor to organize the list of anchor texts into the node summary; and a third module controlling the processor to utilize the node summary to generate prompts to a user via the spoken dialog interface in a live spoken dialog, wherein nodes in the website are matched with open-ended user spoken input and prompts from the spoken dialog interface are seeking the open-ended user spoken input are independent of the nodes in the website.

17. The system of claim 16, wherein each anchor text is further selected based on whether the anchor text contains a noun term.

18. The system of claim 16, wherein nodes in the website are matched with user input to generate prompts to the user by the spoken dialog interface.

* * * * *